United States Patent [19]

Kuzawinski et al.

[11] Patent Number: 5,251,320
[45] Date of Patent: Oct. 5, 1993

[54] POWER CONTROLLER FOR PERMITTING MULTIPLE PROCESSORS TO POWER UP SHARED INPUT/OUTPUT DEVICES AND INHIBIT POWER DOWN UNTIL ALL PROCESSORS HAVE CEASED SERVICE WITH THE I/O DEVICES

[75] Inventors: Mark J. Kuzawinski, Maine; Edward J. Zielinski, Endicott, both of N.Y.

[73] Assignee: International Business Machines Corporation, Armonk, N.Y.

[21] Appl. No.: 528,974

[22] Filed: May 25, 1990

[51] Int. Cl.$^5$ ............................................. G06F 9/00
[52] U.S. Cl. ................................. 395/750; 364/707; 364/DIG. 1; 364/273
[58] Field of Search .................... 395/750; 364/707

[56] References Cited

U.S. PATENT DOCUMENTS

| | | | |
|---|---|---|---|
| 1,646,215 | 10/1927 | Place | 307/23 |
| 3,566,147 | 2/1971 | Masreliez | 307/41 |
| 3,614,745 | 10/1971 | Podvin et al. | 395/650 |
| 3,965,366 | 6/1976 | Sumida et al. | 307/39 |
| 4,204,249 | 5/1980 | Dye et al. | 395/750 |
| 4,305,005 | 12/1981 | McKenney et al. | 307/31 |
| 4,312,035 | 6/1989 | Greene | 395/750 |
| 4,361,766 | 11/1982 | DeMontgolfier et al. | 364/492 |
| 4,362,949 | 12/1982 | McKenney et al. | 307/31 |
| 4,549,274 | 10/1985 | Lerner et al. | 364/492 |
| 4,593,349 | 6/1986 | Chase et al. | 395/750 |
| 4,636,948 | 1/1987 | Gdaniec et al. | 395/650 |
| 4,663,539 | 5/1987 | Sharp et al. | 364/492 |
| 4,747,041 | 8/1989 | Engel | 395/750 |
| 4,809,163 | 2/1989 | Hirsawa et al. | 395/750 |
| 4,922,450 | 5/1990 | Rose et al. | 395/750 |

FOREIGN PATENT DOCUMENTS

| | | |
|---|---|---|
| 056115 | 4/1983 | Japan . |
| 069823 | 4/1984 | Japan . |
| 59-132018 | 7/1984 | Japan . |
| 212930 | 12/1984 | Japan . |

OTHER PUBLICATIONS

IBM Technical Disclosure Bulletin, vol. 30, No, 8, Jan. 1988 "Power Control by Hosts to Shared Devices Such as Direct Access Storage Devices".

*Primary Examiner*—Lawrence E. Anderson
*Assistant Examiner*—Mehmet Geckil
*Attorney, Agent, or Firm*—Pollock, Vande Sande & Priddy

[57] ABSTRACT

A shared power controller for a rack of interface devices which are shared among a plurality of processor units. The shared power controller may be commanded into a power up mode by any connected central processor via its system power interface. A power down of a connected rack of interface units may, however, only be effected when all the connected CPU units enter a power down mode. A system power controller provides both remote and local operation such that diagnosis and analysis of problems may be effected locally at each rack of input/output devices.

3 Claims, 5 Drawing Sheets

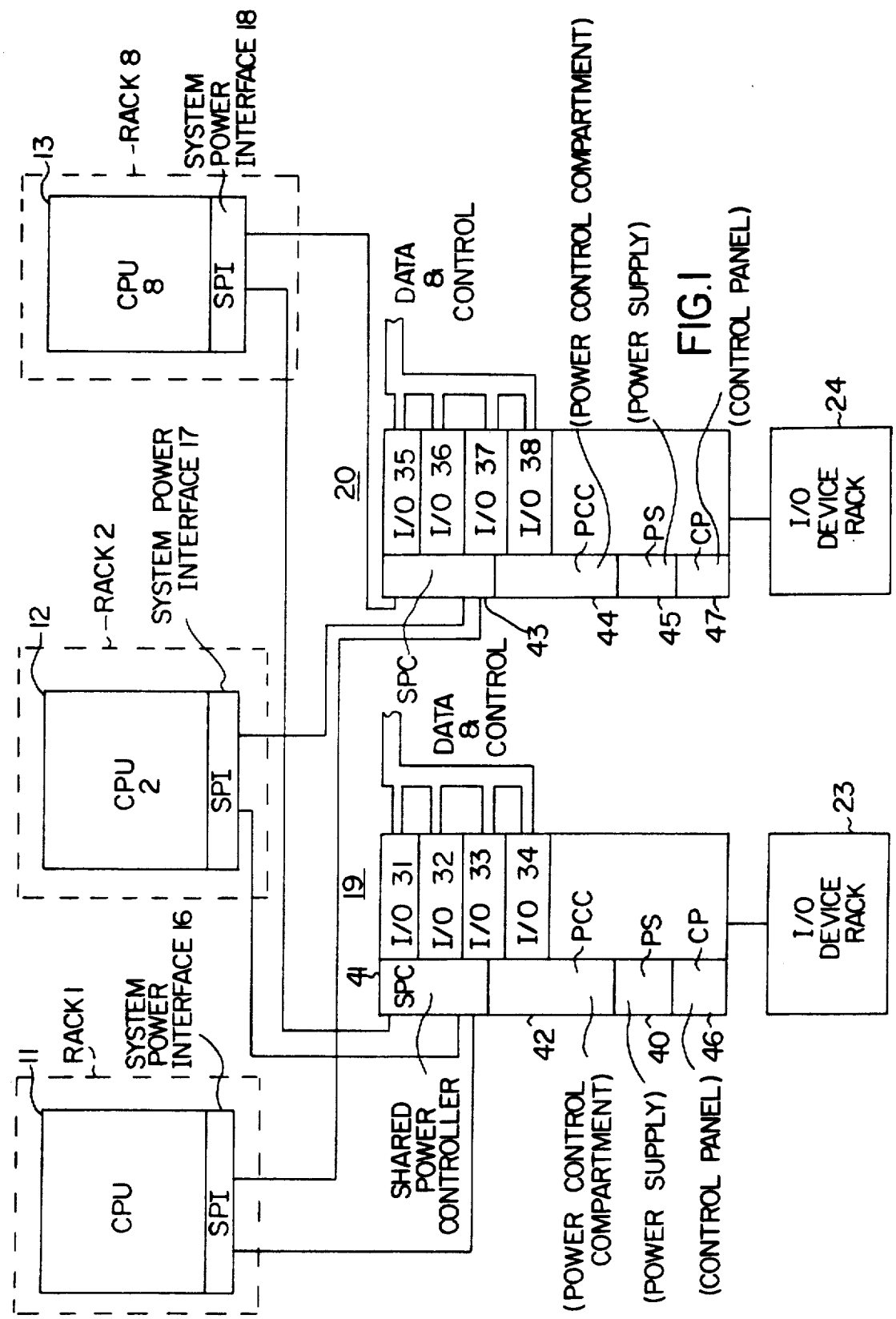

POWER CONTROLLER FOR PERMITTING MULTIPLE PROCESSORS TO POWER UP SHARED INPUT/OUTPUT DEVICES AND INHIBIT POWER DOWN UNTIL ALL PROCESSORS HAVE CEASED SERVICE WITH THE I/O DEVICES

The present invention relates to data processing systems which utilize shared input/output devices. Specifically, a power controller is provided which permits any individual processor to power up a rack of shared input/output devices, while inhibiting any power down command from a processor as long as another processor requires access to the shared input/output device.

IBM System 360/370 processing systems have been employed in systems wherein input/output devices are shared among multiple CPU units. In the IBM 370 series, shared input/output devices are powered up from a controller which uses a sequential shut-down. When employing shared input/output devices in accordance with the prior techniques of shared power control, the input/output devices are turned on from a single controller and maintained in operation until a specific sequential shut-down occurs, instituted by the same processor which initiated the power up command.

The shared input/output devices typically are configured in racks of input/output devices. Each rack may contain one or more DASD memory units which may be shared by more than one processor. Tape drives and other input/output devices may be employed in a rack, accessed by more than one CPU unit.

The input/output devices are under control of a power control compartment (PCC), which will power up the individual input/output devices by asserting the respective control signals in the required order, such that the devices come up in accordance with a given operating protocol for the device. Control over power to the rack of input/output devices is effected through a system power controller. The power up to the rack must be done, in a manner which will prevent any power down from being instituted by any CPU unit, while yet another processor requires access to the shared input/output devices. Thus, it becomes readily apparent that any shared power controller must recognize, or at least take into account, the needs of other CPU units before executing any power down command from any other CPU unit.

In the prior art devices, used in connection with the IBM 360/370 series of processors, the input/output device racks are treated as shared load devices. In these shared load devices, the device would be powered up and powered down by the same CPU. Thus, access to each input/output device rack was controlled by a single CPU. Other CPUs would be permitted access only under their own control, thus requiring a separate power up/power down sequence to be initiated by a subsequent CPU unit desiring access to the shared input/output devices.

SUMMARY OF THE INVENTION

It is an object of this invention to permit multiple processing systems to remotely control power to shared input/output devices.

It is yet another more specific object of this invention to provide the capability for any remote processor to power up a shared input/output device and inhibit the power down of the output device until none of the processors have a present need to use the input/output device.

These and other objects are provided by a system power controller of the present invention. The system power controller can be operated remotely by one of a number of processors to enable a connected group of input/output devices to be powered up through a power control compartment of a rack of input/output devices. Alternatively, the devices may be operated locally, disabling the remote feature.

The system power controller includes circuitry for safeguarding power control so that once powered up, the primary control compartment remains powered permitting other processors which have requested access to the input/output device to complete data transfers to the input/output device. The power controller remains enabled until the last processor requesting service has completed its task with the input/output device. Only when all processors have signalled a power down condition will the power controller be permitted to power down.

The system permits the use of shared input/output devices between processors, so that any processor may power up the power controller, but not power down the power controller in the event other processors are in need of access to the input/output device.

BRIEF DESCRIPTION OF THE FIGURES

FIG. 1 illustrates a plurality of processors 11-13 each in a rack which share input/output devices of two rack structures 19 and 20.

FIG. 4-1 and 4-2 is a more detailed schematic of a shared power controller in accordance with a preferred embodiment of the invention.

DESCRIPTION OF THE PREFERRED EMBODIMENT

Figures 1, 4:
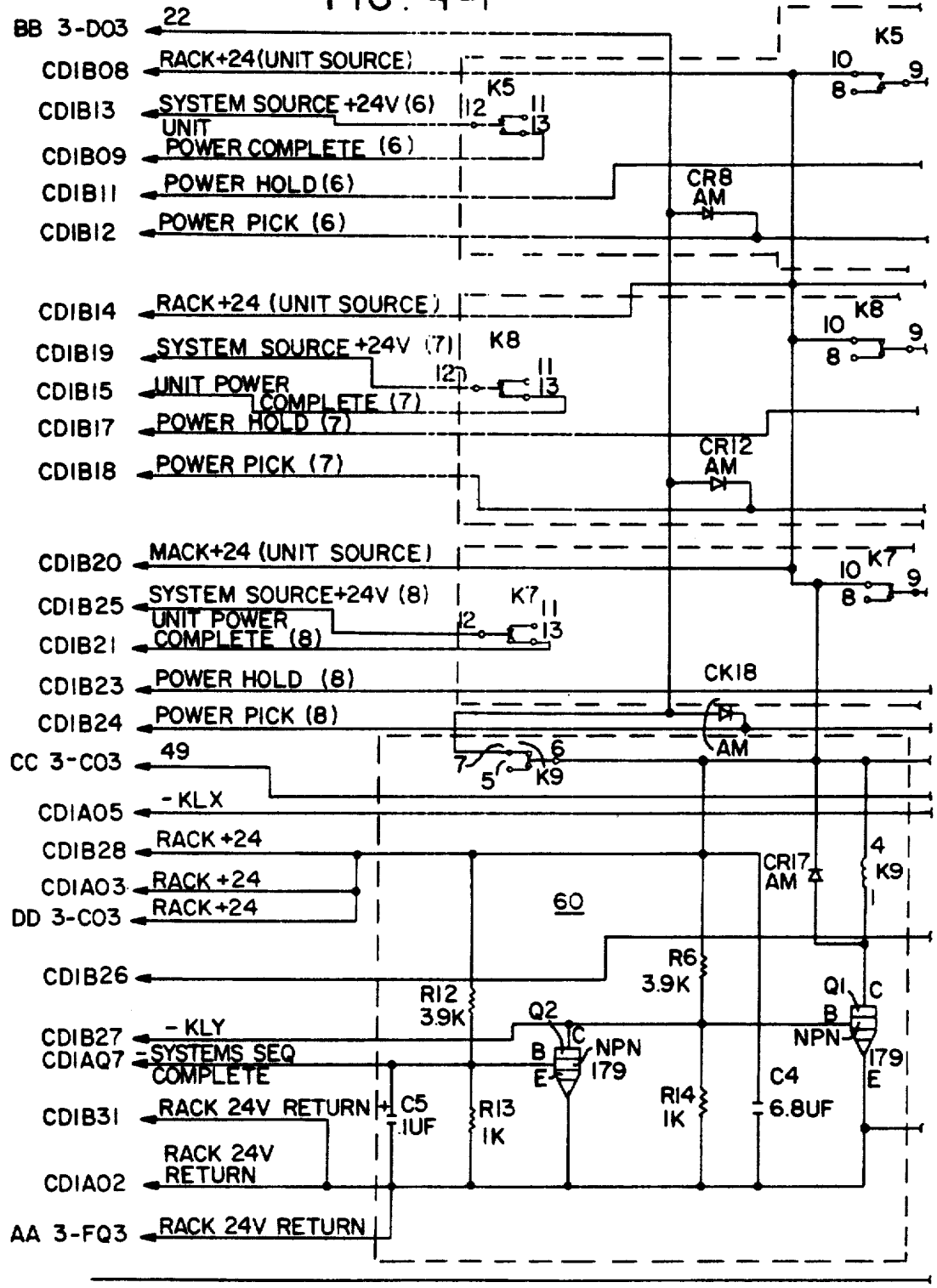
Figures 2, 4:
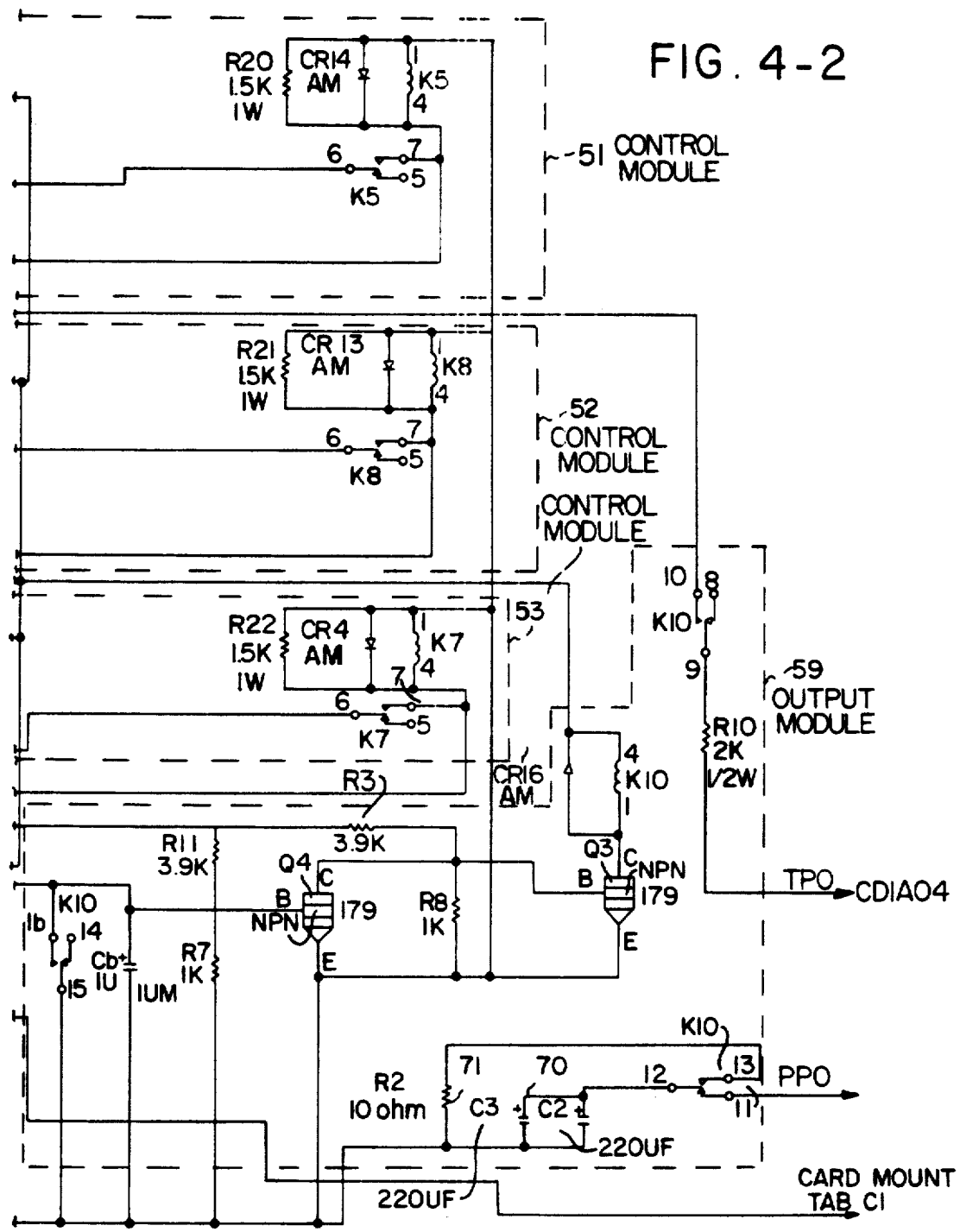

Referring now to FIG. 1, there is illustrated a multi-processor system which shares common input/output devices. Three central processing units (CPUs) 11, 12 and 13 are shown, of a system which may contemplate as many as eight CPU units, each in an individual rack. In the IBM 360/370 architecture, each of these CPU units has a system power interface 16, 17 and 18 which permits controlling the power to an individual rack 19 and 20 of input/output devices. The rack of input/output devices 19 and 20 each include a plurality of input/output devices 31 through 34, and 35 through 38. These devices are typically external memory, such as DASD, hard disk data storage units, and in some instances, these devices may include a work station and/or tape drive units.

Control over the input/output devices of a given rack 19 and 20 is by the power control compartment unit 42, hereinafter referred to as PCC 42 or PCC 44. A power supply 40 and 45 provides a DC operating voltage to the equipment in racks 19 and 20. Additional to these units is a shared power controller (SPC) 41 and 43. A shared power controller is remotely controlled by each of the system power interfaces SPI 16, 17 and 18 of a connected processor. The shared power controller may be operated either remotely from any one of a connected SPI 16, 17 or 18, or may be locally operated by a switch on a control panel 46, 47, associated with each rack 19 and 20. A local operation permits a technician to power up the individual racks 19 and 20, disabling remote access to the system power controllers 41 and 43 during any self-test or diagnosis routines being performed on each of the individual racks 19, 20 containing the input/output devices.

Also associated with each of the racks 19 and 20 of input/output devices are additionally connected racks 23 and 24. As is known in the technology, additional racks 23 and 24 of input/output devices may be controlled to form a string of input/output devices. Each of these individual racks 23 and 24 are interconnected by rack control cables and are controlled from the power control compartment 42, 43 of a connected rack 19 and 20.

Control over the shared power controller is distributed among the CPU units 11, 12 and 13 such that any unit may initiate a power up sequence for the rack 19 and 20. The system power controller will remain in the power up condition until all the connected CPU units 11, 12 and 13, via a respective system power interface 16, 17 and 18, has powered down, thus inhibiting one processor from powering down a connected rack of input/output devices until all connected CPU units 11 through 13 have completed access to a given rack 19 and 20 of input/output devices. Although any connected CPU unit 11-13 may power up, only the last of the CPU units to have entered a power down mode will successfully permit the shared power controller 41, 43 to power down the racks 19, 20 of input/output devices.

Figure 2:
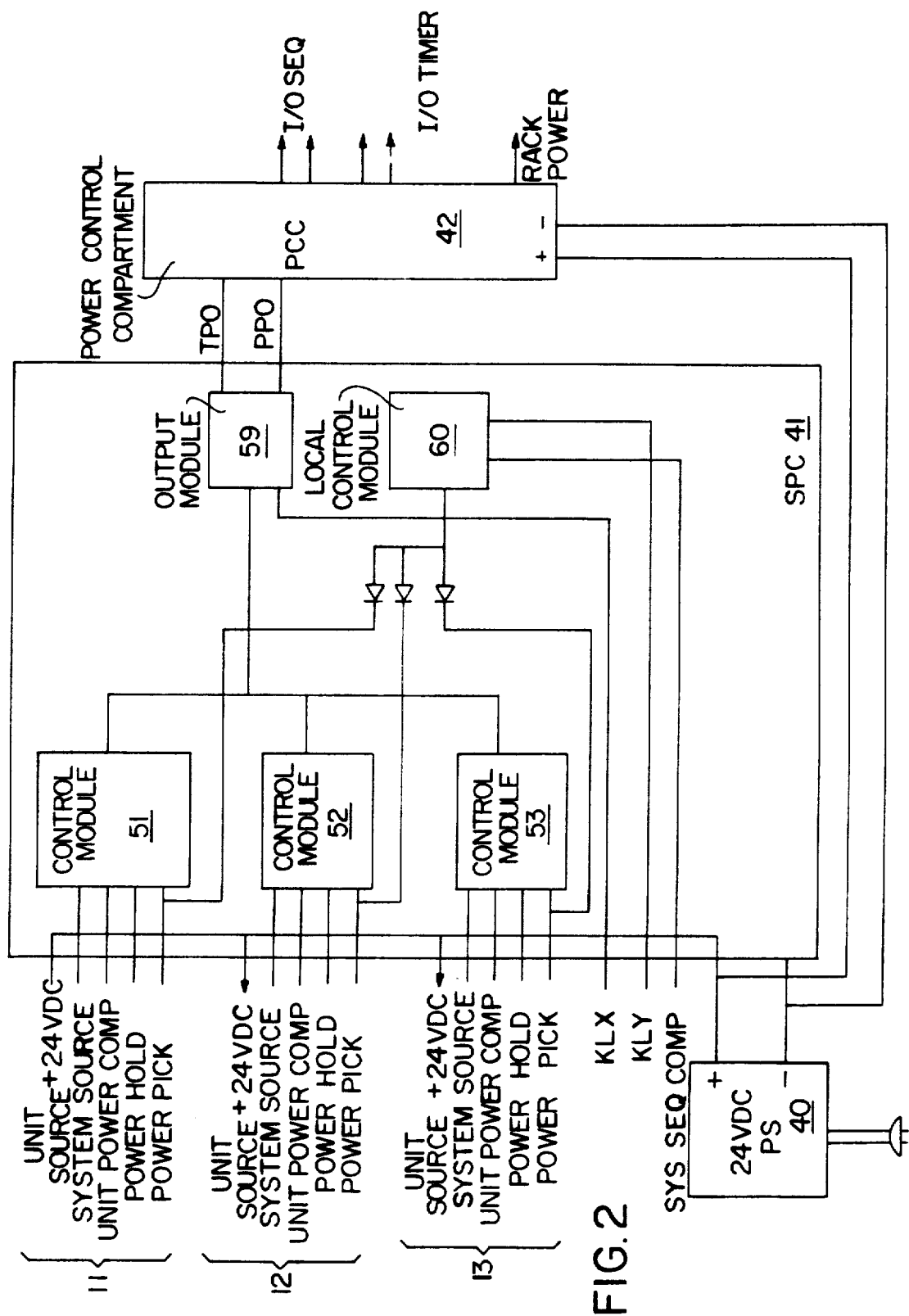
FIG. 2 is a block diagram of a shared power controller in accordance with a preferred embodiment of the invention.

Referring now to FIG. 2, a block diagram is shown of the shared power controller 41 for the rack of input/output devices 19. The shown shared power controller 41 has three control modules 51, 52 and 53, which are connected to the respective processors 11, 12 and 13. As will become apparent from FIG. 2, and the more detailed description of each of the control modules 51, 52, 53 as shown in FIG. 4, more than three or fewer than three CPU units 11, 12 or 13 may be interfaced to a rack 19, 20 via additional control modules.

Each of the control modules 51, 52 and 53 receives four signal lines from the system power interface 16, 17 and 18 of the CPU units 11, 12 and 13. A rack power supply 40 supplies 24 volts DC to an additional conductor of each of the cables connected to the system power interfaces 16, 17 and 18.

The system power interfaces 16, which are described more completely in IBM OEM Manuals directed to the IBM 360/370 processing systems, will use the 24 volts DC to power up a connected interface. When processor 11 initiates a power up command, the shared power controller 41 of FIG. 2 receives the +24 VDC as a power pick signal from the SPI 16, 17 and 18 on an input of control module 51. This will result in a relay closure associated with the power control module 51, signalling via a pair of the processor for the connected CPU 11, 12 and 13. The pair of conductors identified as UNIT POWER COMPLETE and SYSTEM SOURCE are connected to the closing contacts, thus indicating to the controller for the CPU that the power pick has effected closure of the relay associated with control module 51. A POWER HOLD signal is applied through the system power interface 16 to the control module 51 to hold the relay in its energized state.

Each of the control modules 51, 52 and 53 has the identical cabling and conductor scheme connected to its respective system power interface 16, 17 and 18. Each of the outputs of the control modules 51, 52, 53 are "ORed" together such that the activation of any one of them will be identified in the output module 59 as a request to power up the power control compartment 42.

A local control module 60 is shown which, in response to a signal KLY, will assert a power pick on all the control modules 51, 52 and 53. The asserted power pick signal will result in closure of all relays associated with control modules 51, 52 and 53, thus providing a power up enable signal to the output module 59. At the conclusion of any self-test effected using the local control module 60, a SYSTEM SEQUENCE COMMAND will return the control to remote operation, de-asserting the power pick signal to each of the control modules 51, 52 and 53.

Figure 3:
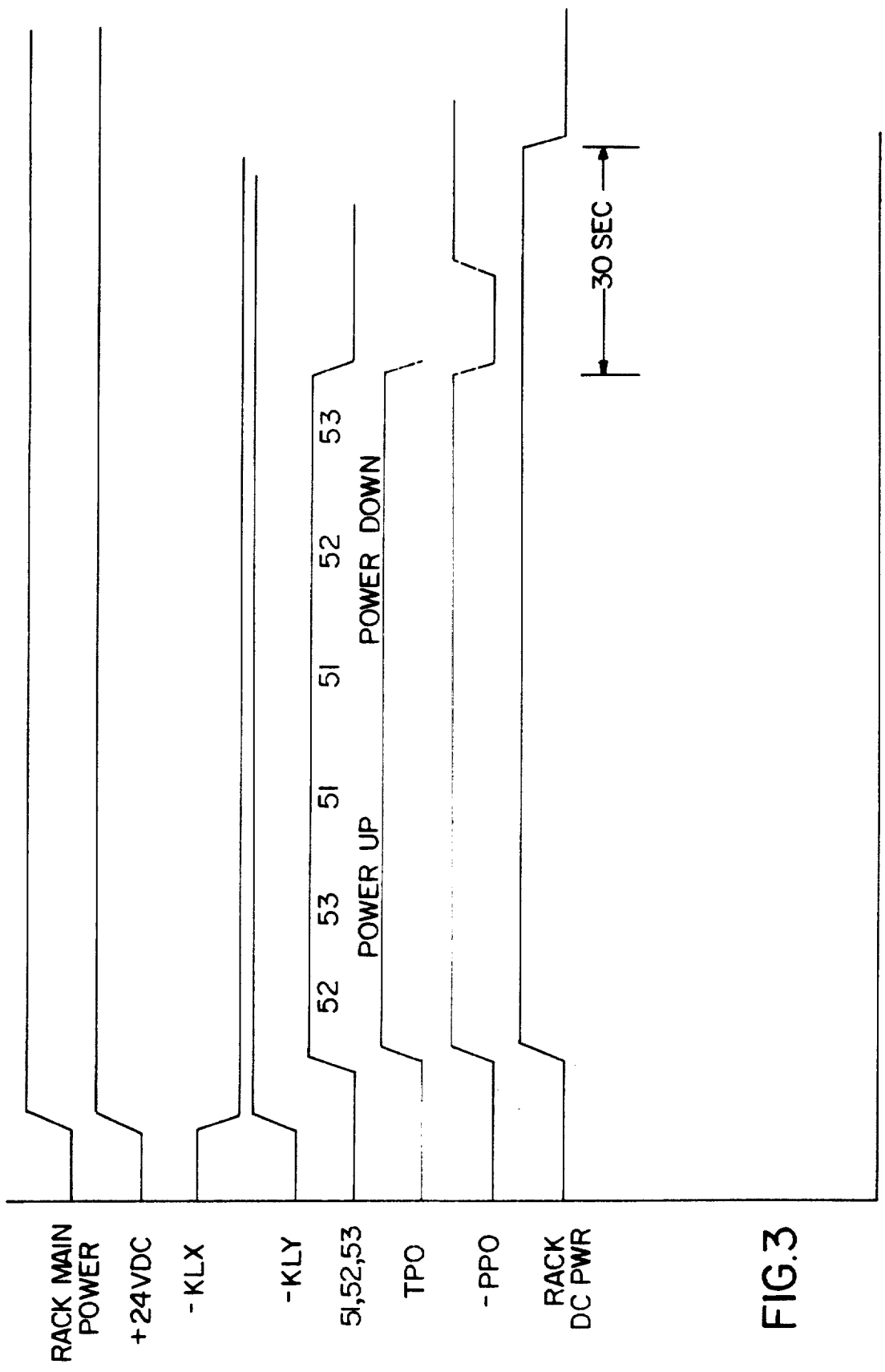
FIG. 3 illustrates the signals which are generated from the shared power controller during a power up and power down command.

The sequence of operation during a power up and power down command is shown in FIG. 3. FIG. 3 illustrates the various levels which are generated in the shared power controller 41 during a power up and power down command.

The top waveform of FIG. 3 illustrates a main rack power on condition when power supply 40 is receiving the AC input voltage. The output 24 volt DC voltage produced by the power supply 40 is shown as being concurrent with the energization of the rack main power.

The signal levels −KLX and −KLY indicate a remote control operation is to be effected. These signals result from a control panel 46 switch setting, identifying the rack associated with the system power controller as operating in the remote mode. In the remote mode, KLX will prime the remote mode operation and inhibit local mode by rendering output module 59 inactive. During power up, any one of the control modules may initiate power up of a rack of input/output devices. As shown in FIG. 3, control module 52, in response to a signal from the CPU 12, and its related system power interface 17, will render TPO, the signal produced from output module 59, high. Subsequent power up commands from CPU 11 and 13 do not change TPO. Shown also in FIG. 3, is a segment in which each of the control modules enter a power down mode. As illustrated, control module 51 is the first to power down, followed by control module 52, and then control module 53. Only after control module 53 has powered down, indicating that all the CPU units 11, 12 and 13 have entered a powered down condition, relating to a connected rack, will TPO from the output module 59 enter a low logic state. At the same time, −PPO, a pulsed output from the output module 59, will go low, commanding the power control compartment (PCC) unit 42 to enter a power down mode. As long as any one of the control modules 51, 52 or 53 is asserting a need for power up, TPO remains high, and inhibits the generation of a PPO signal. The power control compartment 42 will not enter a power down condition until a PPO signal of a pulsed duration is applied.

FIG. 3 also illustrates that the rack DC power generated from the power control compartment, along with I/O sequence and I/O timing signals, will remain in effect for 30 seconds after the PPO pulse is initiated. This permits the PCC to power down in a preferred sequence such that the input/output devices 31, 32, 33 and 34 are powered down in a way which will preserve data.

Thus, it can be seen that the foregoing device operates in accordance with FIG. 3 to maintain a power up condition on any rack in which any CPU has indicated a power up condition. The remaining CPU units will not produce any power down command to a connected rack until the last of the CPU units has completed any data transfer operations with a connected rack 19.

Details of each of the control modules 51, 52, 53 and output module 59, and local control module 60 may be seen from FIG. 4-1. As FIG. 4-1 indicates, each of the control modules 51, 52 and 53 comprise a single relay having a plurality of contact sets. The first of these contact sets permits a POWER PICK signal to close the relay momentarily. At this time, the POWER HOLD signal is introduced from the respective system power interface to hold the relay in a closed condition. A second pair of contacts permits the SYSTEM SOURCE and UNIT POWER COMPLETE signals to be read by the processor of a given CPU unit 11, 12 and 13.

When a given control module 51 experiences the power pick and subsequent power hold energization, a 24 volt DC signal is applied through a third set of contacts to the relay K10, causing the relay K10 to close. This relay K10 is a part of the output control module 59, and thus asserts on a first set of contacts a 24 volt DC level through a resistance element as the TPO signal. As long as the relay K10 is closed, indicating that one of the control modules 51, 52 and 53 is asserting a power up condition, TPO remains high, and the power control compartment remains energized.

When a power down is effected, a PPO signal may be generated when each of the control modules 51, 52 and 53 is in a power down condition. The power down condition is realized when the connected system power interface removes the POWER HOLD signal, thus permitting the relay to resume its non-energized state. During the non-energized state, the PPO signal is generated due to the discharge of a pair of capacitors 70 through a resistive element 71, shown in FIG. 4-2. During the time the PPO is asserted, the associated relay contacts of relay K10 are closed, discharging the capacitor 70. At the time of a power down, the relay contacts K10 resume their normal unenergized state, and through the PCC, capacitors 70 charge, producing a pulsed current from the PCC unit 42 through the capacitors 70. Thus, a PPO signal of limited duration is generated.

The local control module 60 is shown which, in response to the KLY signal, will energize relay K9. The energization of relay K9 will apply a signal for energizing the respective relays of control modules 51, 52 and 53 on each of the POWER PICK LINES of a connected system power interface. In this mode, each of the relays closes, thus effecting the raising of the TPO signal line, powering up the power control compartment 42. A SYSTEM SEQUENCE COMPLETE signal will result in a de-energizing of this signal. A KLX signal is used to inhibit the operation of relay K10 during certain service procedures.

Thus, there is shown a system which will control a rack of input/output devices such that any connected CPU may power up the connected rack, but inhibit powering down the connected rack until all CPUs enter a power down mode. Those skilled in the art will recognize yet other embodiments described more particularly by the claims which follow.

We claim:

1. In a multiprocessor system for data processing having shared input/output devices, a shared power controller for enabling said devices comprising:
   a plurality of input connections of a plurality of control modules for receiving control signals from a system power interface of each processor;
   a plurality of switching devices included within the control modules for supplying a first control signal to an output module for indicating a power up command in response to a POWER PICK signal and POWER HOLD signal received from said input connections;
   a relay means included in said output module for supplying a second control signal to an external power control compartment, coupled with said shared input/output devices when any one of said switching devices is supplying said first control signal indicating a power up command and maintaining said second control signal as long as any one of said switching devices is asserting a first control signal, and means for supplying a pulse output signal to said external power control compartment when all of said switching devices are not supplying a power command, whereby said input/output devices are initially powered up when any one of said processor system power interfaces issues a POWER PICK signal, and is subsequently powered down only when none of said processor system power interfaces generates a POWER PICK or POWER HOLD signal; and,
   means located at a rack of said shared input/output devices for implementing a self-test of shared input/output devices which asserts a power pick signal to said plurality of switching means for generating a power up command in a local mode of operation when none of said processors are accessing said shared input/output devices.

2. The shared power controller of claim 1 wherein each of said plurality of switching devices comprises a relay responsive to a respective system power interface POWER PICK signal and which provides a UNIT POWER COMPLETE signal to a respective interface.

3. The system shared power controller of claim 1 wherein said relay means receives a signal KLX for enabling said relay means to supply a control signal to said power control compartment.

* * * * *

UNITED STATES PATENT AND TRADEMARK OFFICE
CERTIFICATE OF CORRECTION

PATENT NO. : 5,251,320

DATED : October 5, 1993

INVENTOR(S) : Kuzawinski et al

It is certified that error appears in the above-identified patent and that said Letters Patent is hereby corrected as shown below:

```
In column 1, line 41, delete ",";
In column 3, line 58, after "of" insert --contacts--;
In column 4, line 34, after "mode" insert --operation--;
In column 6, line 34, after "power" insert --up--;
            line 42, after "of" insert --said--;
            line 53, delete "system".
```

Signed and Sealed this

Twenty-first Day of June, 1994

Attest:

BRUCE LEHMAN

Attesting Officer

Commissioner of Patents and Trademarks